3,322,948
X-RAY DIFFRACTION GONIOMETER WHEREIN THE SPECIMEN IS STATIONARY AND THE SOURCE AND DETECTOR ARE MOVABLE
Nils Tryggve E. A. Baak, Waterville, and Robert H. Simmons, Toledo, Ohio, assignors to Owens-Illinois Inc., a corporation of Ohio
Filed Dec. 21, 1964, Ser. No. 419,962
5 Claims. (Cl. 250—51.5)

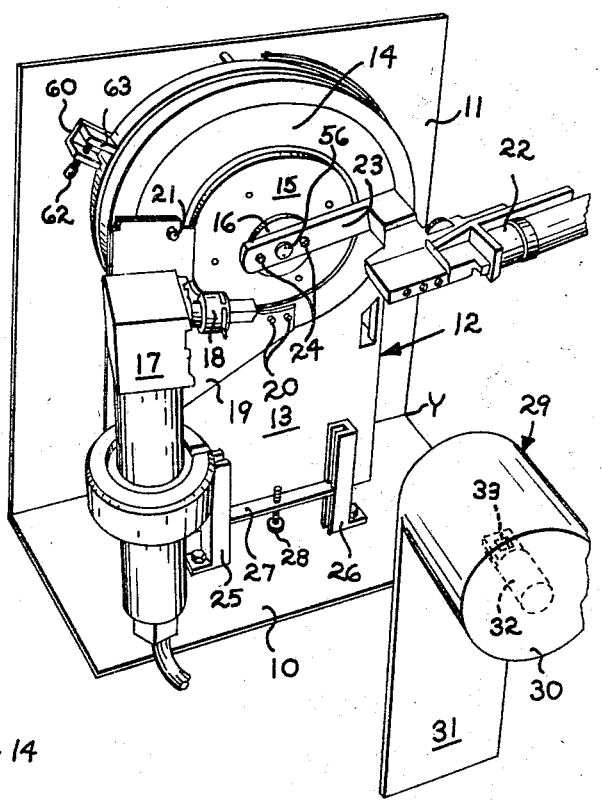

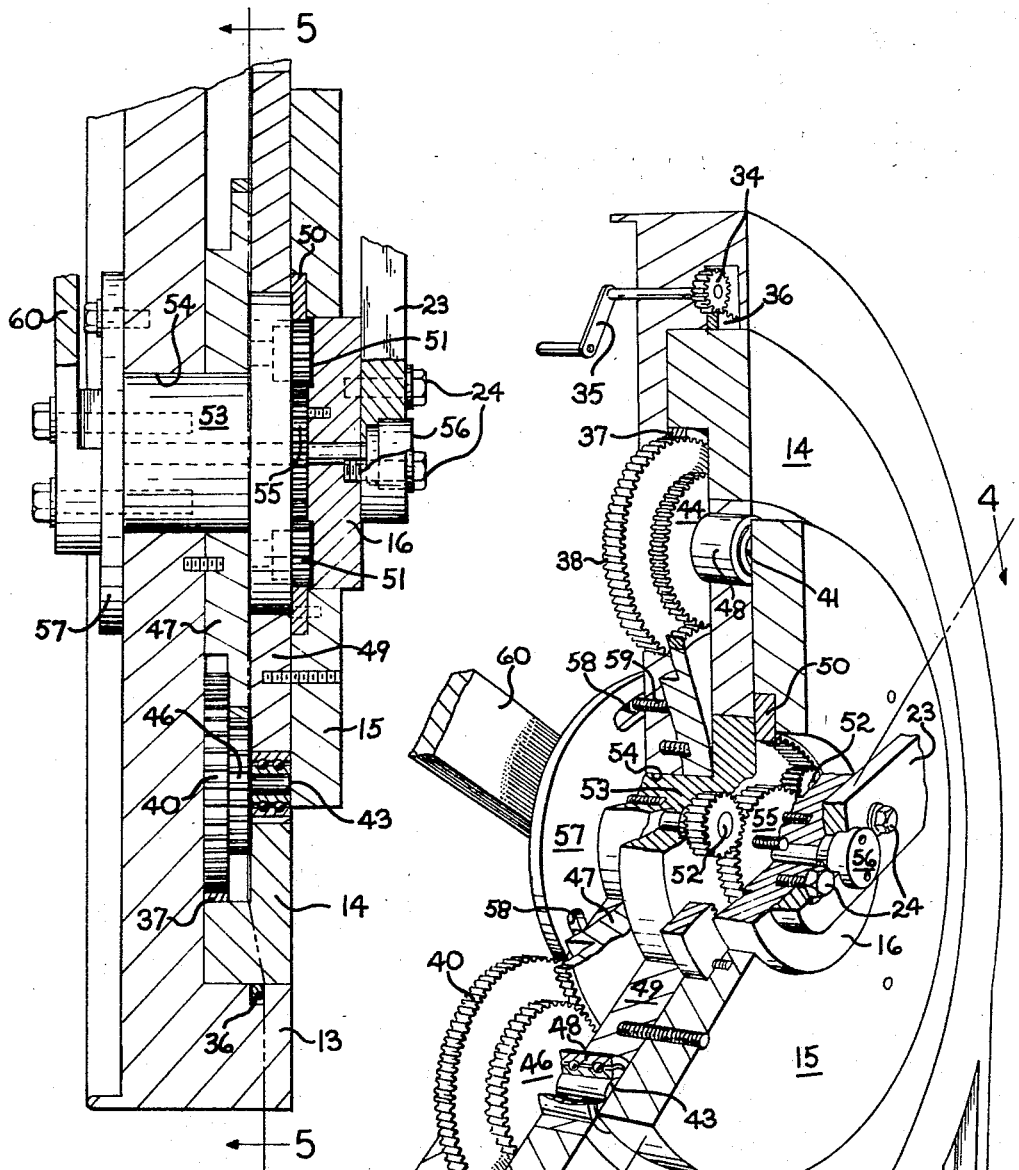

This invention relates to apparatus for analyzing test bodies by X-ray diffraction.

More particularly, this invention relates to X-ray diffraction apparatus which is capable of taking diffraction patterns of a liquid sample.

Present day X-ray diffraction goniometers, for example the type shown in U.S. Patent No. 2,870,237, involve mechanism which rotates a sample about a vertical axis at a particular angular velocity and at the same time moving a counting device or X-ray indicator at twice the angular velocity of the sample rotation and in the same direction. In these situations, the X-ray source is mounted on a fixed pedestal relative to the mechanism for driving the sample and detecting device. Also, some goniometers presently in use, of the general type in the above-mentioned patent, rotate a sample about a horizontal axis, with the consequent rotation of the detecting device about the same horizontal axis. In both instances, the X-ray source is stationary.

It can readily be seen that, in the event it is desired to study samples of loose powder or liquid, it is impossible to rotate the sample about a horizontal axis from the standpoint that the sample runs out of the sample holder.

Obviously, it is impossible to examine liquid samples by rotation about a vertical axis, without devising some sort of container for the sample, in which the event the scanning becomes complicated by the fact that the X-rays must pass through the wall of the sample holder before striking the liquid and resulting emanations must necessarily pass out through the wall of the sample holder. In this situation, it is difficult to evaluate the results.

In view of the foregoing, it is an object of this invention to provide apparatus for making X-ray diffraction studies of liquid or powder samples.

It is a further object of this invention to provide apparatus for making X-ray diffraction studies of samples which are held stationary during the study.

It is a still further object of this invention to provide an X-ray diffraction goniometer in which both the X-ray source and the counting or detecting device are mobilized.

Other and further objects will become apparent from the following description taken in conjunction with the annexed sheets of drawings, wherein:

FIG. 1 is a front, perspective view of the apparatus of the invention showing the sample holder axially displaced;

FIG. 2 is an exploded perspective view of the apparatus of FIG. 1;

FIG. 3 is a cut-away perspective view on an enlarged scale illustrating the driving mechanism of the apparatus of FIG. 1;

FIG. 4 is a partial cross-sectional view taken along line 4—4 of FIG. 3; and

Figure 5:
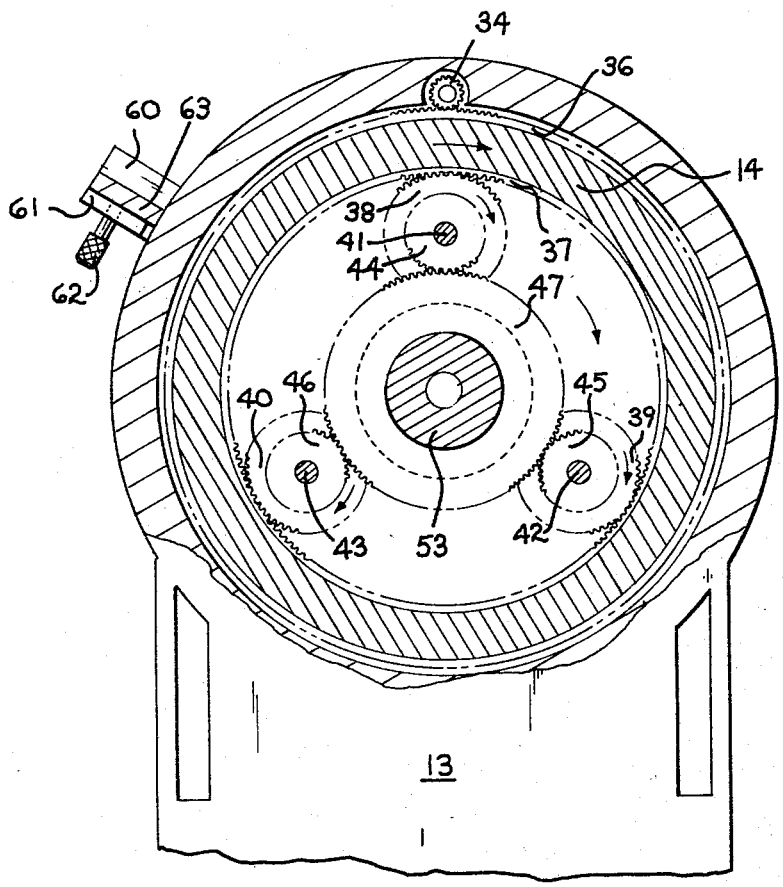
FIG. 5 is a sectional view taken along line 5—5 of FIG. 4 on a somewhat reduced scale.

With particular reference to FIGS. 1 and 2, the apparatus of the invention comprises a base 10 in the form of a horizontal plate and a vertical supporting plate 11 connected thereto. The goniometer mechanism 12 is fixed to the base 10 and stands in a generally vertical direction with the supporting plate 11 maintaining the goniometer 12 in vertical orientation by appropriate posts and connections extending from the back of the goniometer.

The general arrangement of the goniometer 12 comprises a housing 13 which contains the drive gears and other precision mechanism. The front face of the housing is provided with a circular opening within which a first annular ring 14 is mounted for rotation about the horizontal axis "Y." It should be understood that the ring 14 may be rotated in either direction; however, normally during X-ray scanning operations the ring 14 will be rotated in a clockwise direction from the position shown.

A second annular ring 15 carried co-axially within the ring 14 is adapted to rotate in the same direction as the ring 14 but at a velocity which is one-half the angular velocity of the ring 14. The ring 15, as will later be described, is adapted to drive a concentrically located, circular mounting member 16.

The mounting member 16 is geared to the ring 15 so that it will rotate in a direction opposite to the direction of rotation of the ring 14 and at the same angular velocity.

As can best be seen from FIGS. 1 and 2, a conventional X-ray source or gun 17, having the usual aperture mechanism or divergence slit system 18 connected thereto, is fixed to a mounting plate 19 having a somewhat triangular configuration. The mounting plate 19 in turn is bolted to the ring 14, for example at 20 and 21. In this manner it can be seen that the X-ray source 17 will be rotated about the axis "Y" of the goniometer. It should be understood that the X-ray source 17 and its aperture mechanism 18 are aligned such that the X-rays emitted from the gun 17 will always be directed at the axis "Y."

A counting device or X-ray detector 22 is carried by an arm 23. The arm 23 is fixed to the circular mounting member 16 by a pair of bolts 24. It should be pointed out that the X-ray indicator 22 will have its line-of-sight passing through the axis "Y" in substantially vertical alignment with the stream of X-rays issuing from the aperture mechanism 18 of the X-ray gun 17.

The base 10 also carries a pair of vertically slotted guides 25 and 26 which are bridged by a block 27. The block 27 has a threaded hole extending therethrough within which an adjusting screw 28 is carried.

The guides 25 and 26 serve as mounting means for a sample supporting chamber 29. The chamber 29 generally comprises a cylindrical heater portion 30 which in turn is fixed to a vertical mounting plate 31. The plate 31, as will readily be apparent, is adapted to be positioned within the slots of the slotted guides 25 and 26 with its lower end abutting the upper end of the screw 28. For adjusting the chamber vertically with respect to the base of the apparatus, it is only necessary to turn the screw 28.

The cylindrical heater containing portion 30 also carries a sample mount 32 which is intended to support a small, sample-containing chamber 33. In actual practice, the sample holder takes the form of a rectangular plate with a shallow rectangular depression formed in the top of the plate within which the sample is placed.

It should be readily recognized that the sample chamber 29 may be of any conventional configuration, it only being necessary that the chamber serve, if desired, as a regulator for the environment in which the sample is positioned. When the sample chamber is mounted in operative relationship with respect to the goniometer 12, the sample will have its surface on the axis "Y."

Turning now to FIGS. 3–5, the details of the goniometer mechanism will be described. Basically, the goniometer is driven by rotation of a pinion gear 34 which, for purposes of illustration, is shown connected to a crank 35. It should be understood that in actual practice, the pinion 34 is driven with appropriate gearing by a synchronous motor of the constant speed type.

The pinion 34 is in mesh with an outer ring gear 36 carried by the ring 14. The ring 14 also carries an inner ring gear 37 which is in mesh with three spur gears 38, 39 and 40. Each of the spur gears 38, 39 and 40 are mounted on shafts 41, 42 and 43. These shafts carry a second set of spur gears 44, 45 and 46 which rotate with the spur gears 38, 39 and 40. Each of the spur gears 44, 45 and 46 are in mesh with a stationary plate gear 47. As can best be seen when viewing FIGS. 3 and 4, the plate gear 47 is fixed to the housing 13. The shafts 41, 42 and 43 are supported by suitable roller bearings 48 whose outer races are fixed within openings of an annular plate 49.

The annular plate 49 carries the previously mentioned ring 15 fixed to its front face. The ring 15 has an inner ring gear 50 fixed thereto which is adapted to mesh with three spur gears 51 which are radially spaced at 120° intervals with respect to the axis of the goniometer. Each of the spur gears 51 are mounted to rotate about their own axes on shafts 52 carried by a main hub assembly 53.

The hub assembly 53 has a portion thereof which extends axially through an opening 54 in the housing 13. The housing 13 serves to support and locate the hub on a fixed horizontal axis, yet permitting the hub to have a limited degree of rotation with respect to the housing, as will later be explained.

The spur gears 51 are in mesh with a pinion 55 which in turn is fixed to the inner face of the circular mounting member 16. As previously explained, the mounting member 16 carries the arm 23 of the counting device or detector 22. The pinion 55 and circular mounting member 16 are held in their assembled position relative to the hub 53 by a bolt 56 which extends through an opening in the arm 23 and in the circular mounting member 16 and has its inner end threaded in the hub assembly 53. In this manner all of the parts are maintained in their assembled and axially aligned relationship.

The rearward portion of the hub assembly 53 has a circular plate 57 fixed thereto. As can best be seen in FIGS. 2 and 3, the circular plate 57 is provided with three circumferentially extending, radially spaced slots 58 formed therein. Bolts 59 are adapted to extend through the slots 58 and are threadedly received within holes in the back of the housing 13. With this particular arrangement, the plate 57 and the hub 53 to which it is attached may be rotated slightly in relation to the housing 13 for zeroing or alignment purposes, as will be later explained.

An arm 60 is bolted to the plate 57 and extends radially outward to a point beyond the outer rim of the housing 13. The outer end of the arm 60 carries a bracket 61 extending at right angles with respect to the arm 60. The bracket 61 has an opening formed therein within which the barrel of a micrometer 62 is positioned. Cooperating with the micrometer 62 is a bar 63 which is fixed to the housing 13.

The radially extending bar 63 bears against the stem of the micrometer 62. Thus, it can be seen that the radial position of the arm 60 with respect to the housing 13 may be adjusted by the micrometer 62.

Inasmuch as the arm 60 is fixed to the plate 57 and the hub 53, loosening of the bolts 59 and operation of the micrometer 62 will rotate the hub 53 resulting in rotating the arm 23 which carries the indicator or counting device 22. In this manner a slight adjustment of the position of the arm 23 in relation to the sample being inspected may be made independent of the mechanism to which the gun 17 is connected. This adjustable feature is for aligning purposes and constitutes a distinct improvement over presently existing goniometer mechanisms. It should be pointed out that once the adjustment has been made, the bolts 59 are tightened down with the result that the angular position of the hub 53 is fixed in relation to the housing 13 so that from then on the hub does not shift or rotate relative to the housing 13.

Having described the various mechanisms making up the goniometer of the invention, the following description of its operation will be given.

A sample, which it is desired to study, is placed in the sample chamber 33. The sample chamber or holder is then placed on the sample support 32 and the sample and its environmental control chamber 29 are placed in position in the path of the X-rays being emitted from the gun 17. Vertical adjustment of the chamber 29 may be made by operation of the thumb screw 28. It should be apparent that the surface of the sample will lie in the horizontal, axial plane of the goniometer 12. Proper positioning and adjusting of the gun 17 with respect to its mounting plate 19 may then be made, if not previously in alignment, so that the X-ray emission is directed toward the sample. The counting device or detector 22, by reason of its mounting arrangement, will be viewing the radiated surface of the sample at the same angle with respect to the horizontal as the X-ray beam describes with the horizontal. Any slight out-of-adjustments which may occur are corrected by the above described adjustments carried out through the use of the micrometer 62.

With the apparatus thus set in alignment, the crank 35 may be operated to drive the pinion 34 to effect rotation of the ring 14 to which the gun 17 is mounted and through the numerously described gears, drive the arm 23 in the opposite direction at the same angular velocity as the rotation of the ring 14. The actual sizes of the gears and their relationships to each other are so proportioned that one-to-one relationship with respect to the angular velocity of the pick-up and the X-ray source is maintained. During the examination of a sample it is normal practice to scan the sample at constantly changing angles. If can readily be seen that by rotation of the pinion 34 at whatever speed is desired and by recording the output of the indicator 22, a complete X-ray diffraction pattern may be obtained.

Other and further modifications may be resorted to within the spirit and scope of the appended claims.

We claim:

1. Apparatus for the diffraction of X-rays on the horizontal surface of specimens and for taking the diffraction spectrum thereof comprising, a base, a stationary specimen support mounted on said base, an X-ray radiation source, a detector for receiving X-rays diffracted from said specimen, a pair of co-axial mounting members carried by said base for rotation with respect thereto about a horizontal axis, means interconnecting said mounts for concurrent rotation about a common axis in opposite directions at equal angular velocities, means connecting the X-ray source to one of said mounting members, means connecting the detector to the other of said mounting members, and means positioned between said specimen support and base for adjusting the elevation of said specimen support relative to the base, whereby the X-rays will impinge on the specimen surface at all angles of rotation.

2. The apparatus as defined in claim 1 further including, means connected to one of said mounting members for adjusting its angular position relative to the base, independently of the angular position of the other mounting member.

3. An X-ray diffraction goniometer comprising, a base, a goniometer housing mounted on said base, a first annular ring supported in said housing, means connected to said first ring for rotating said ring about a horizontal axis, a second annular ring mounted co-axial with respect to said first ring and mounted for relative rotation with respect thereto about a common axis, interconnecting drive means between said rings for causing the second ring to rotate at one-half the angular velocity of the first ring in the same direction, a central hub assembly mounted in said housing and co-axially located within said rings, a set of planetary gears mounted on said hub, an annular ring gears fixed to said second ring and engaging said planetary gears, a central pinion gear in engagement with said planetary gears, a mounting plate carried by said pinion gear, whereby rotation of said second ring will result in rotation of said mounting plate in a direction opposite to the direction of rotation of said first ring at the same angular velocity, an X-ray source, means mounting said source on said first ring, an X-ray detector, means mounting said detector on said mounting plate, and means for supporting a sample with its surface located at the common axis of said goniometer.

4. The apparatus as defined in claim 3, wherein said central hub is adjustably mounted to said housing, whereby the angular relationship of the hub may be prepositioned so as to provide an alignment adjustment of the detector.

5. The apparatus as defined in claim 4, wherein said adjustable mount comprises a radial arm connected to said hub, a micrometer mounted on the end of said arm, and a fixed, reference stub on said housing with which the micrometer cooperates.

References Cited

UNITED STATES PATENTS

| | | | |
|---|---|---|---|
| 2,666,147 | 1/1954 | Borst | 250—51.5 |
| 3,218,458 | 11/1965 | Furnas | 250—51.5 |

RALPH G. NILSON, *Primary Examiner.*

A. L. BIRCH, *Assistant Examiner.*